Patented Jan. 11, 1944

2,338,791

UNITED STATES PATENT OFFICE 2,338,791

COMPOSITION OF MATTER

Frederick R. Weedon, Yonkers, N. Y.

No Drawing. Application August 17, 1939,
Serial No. 290,571

3 Claims. (Cl. 167—22)

My invention relates to compositions of matter and more particularly to chemical compositions that are suitable for certain uses as germicides, fungicides and insecticides. The compositions are effective on both animal and vegetable tissues or substances, for destroying or inhibiting germs and various micro-organisms and fungi, which cause diseases of animals and plants. They also inhibit certain organisms such as worms, lice and termites which attack wood and plants in general. The compositions are also efficacious in preventing fouling by marine organisms of metal or wood structures, such as ship's bottoms submerged in water.

The compositions of my invention may be produced and used in liquid, unguent or powder form. They contain a potentially highly reactive substance having a halogen or pseudo halogen group usually attached to a carbon atom, and an auxodyne, which produces the desired action when brought into the proper medium, and a stabilizing constituent which maintains the potentially active material in an inert state prior to use. The active compounds are generally organic in nature and are poorly soluble in water.

The physiological applications of these compositions include direct application to the diseased tissue, injection into sinuses and in some instances internal use in very dilute concentrations. The commercial or industrial applications which I consider of primary importance, include embodying of the compositions in penetrative solvents for impregnating wood and other fibrous materials and incorporating the compositions into paints and other coating materials to be applied to fibrous and metal surfaces.

In accordance with this invention I have discovered that a number of normally very unstable organic compounds, which contain a halogen or pseudo halogen group and also an auxodyne group, capable of reacting with active hydrogen with liberation of the halogen, may be made into stable compositions by combining with inert solvents (liquid or solid); and that the unstable active material may be utilized for the various germicidal and other purposes mentioned above, by bringing the composition into association with water or other media having an active hydrogen.

Apparently, the auxodyne group makes the active compound unstable in the presence of water or other substance containing an active hydrogen so that the compound decomposes and releases the halogen or halogen like substance (pseudo halogen) in a nascent, highly reactive state. The liberated reactive substance attacks the micro-organisms, fungi and insects and either destroys them or inhibits further damage by them.

The chemical group or radical which apparently effects the above described instability of the active compound, I have identified generically as an auxodyne. This term is intended to cover the following types of chemical groupings, which are cited as illustrative but non-limiting: —C=C— (conjugated and non-conjugated); —$C_6H_5$; —O—; —S—; —N=C; —C≡N; —$NO_2$. Other auxodynes are elements of more poisonous nature such as arsenic, antimony, tin, mercury, lead, bismuth which are represented by such active and lachrymatory but poisonous compounds as the phenyl di-halogen arsines, $C_6H_5$—As—$X_2$. For ordinary use it is preferred to use the less poisonous previously mentioned compounds.

Illustrative but non-limiting examples of the normally unstable, active compounds which may be used in my compositions and which contain the active halide or pseudo-halide and the unstabilizing auxodyne group are as follows, the X in the formulas representing halogen or pseudo-halogen Ketone alpha-halides, $CH_3$—CO—$CH_2X$
Benzyl alpha-halides, $C_6H_5$—$CH_2X$
Halogenated ethers, $XCH_2$—O—$CH_2X$
Halogenated mercaptans, $XSCX_3$
Phenyl carbylamine halides, $C_6H_5$—N=$CX_2$
Alpha-halogen benzyl cyanides, $C_6H_5$—CHX—CN
Nitroform halides, $CX_3$—$NO_2$
Alpha-halogen acetophenones, $C_6H_5$—CO—$CH_2X$
O and P-xylyl alpha-halides, $CH_3C_6H_4$—$CH_2X$
Esters of alpha-halogenated
  organic acids, $XCH_2$—CO—$OC_2H_5$ Certain more specific examples of the active compounds are as follows:

Iodo acetone ($CH_2ICO.CH_3$)
    Bromoacetone ($CH_2BR.CO.CH_3$)
    Iodoacetophenone ($CH_2I.CO.C_6H_5$)
    Bromacetophenone ($CH_2Br.CO.C_6H_5$)
    Iodonitro methane ($CH_2I.NO_2$)
    Ethyl iodoacetate ($CH_2I.CO.OC_2H_5$)

The above mentioned specific compounds, it will be observed, contain no active hydrogen. Molecules of these compounds do not, therefore, cause halogen instability in an adjacent molecule. These compounds also have the available halogen joined directly to carbon. Therefore they are lachrymatory and have strong tendencies to decompose in the air. In undiluted form they are of a dangerous or irritating nature to man and cannot be diluted satisfactorily with water because of their poor water solubility. For such reasons they have not hitherto been practicable for use as germicidals and the like.

To convert the unstable active compounds into stable but potentially reactive compositions characteristic of my invention, I disperse or dissolve the active compounds in an inert, non-aqueous, organic solvent medium (liquid or solid) which has little or no active hydrogen (that is, no hydrogen except that joined directly to a carbon atom) and which prevents the compound from decomposing and therefore, in effect, stabilizes the compound until it is ready for use. However, this solvent medium is miscible or at least partially miscible with water or other media containing an active hydrogen atom, which will cause decomposition of the potentially active compound and liberation of the halogen or pseudo halogen for the aforesaid purposes.

The organic solvents or stabilizing media may vary appreciably in class and characteristics. The solvents may be in the form of a thin organic liquid such as for example, the following:

Acetone
Methyl ethyl ketone
Ethyl ketone
Cresylic acid neutralized preferably with lime
Methyl acetate
Ethyl acetate
Acetaldehyde
Furfural
Methyl furfurate
Diethyl ether
Diphenyl ether When the compositions are made up with these thin solvents they will penetrate tissue or fibrous substances such as for example wood, carrying the active ingredient into the treated substance. In this connection one commercial application which is of great value is the treatment of wooden poles, ships timbers, pilings and the like, using as the active ingredient iodoacetone and as the solvent, commercial cresylic acid neutralized with lime. Commercial creosote, although containing some active hydrogen may be used because its a very weak acid and does not affect any substantial decomposition.

Where penetrative action is not as important as other effects, other solvents will be used. For example, where the composition is used for injection purposes, the solvent medium is desirably a light oleaginous liquid such as cotton-seed oil. For industrial applications such as in paints, the active compound will be dispersed or dissolved in the usual paint vehicle such as for example, linseed oil and turpentine together with the usual paint pigment, none of which ordinarily contains active hydrogen.

Where the composition is to be applied in the form of an unguent or ointment, a solvent medium will be used which is more in the nature of a thickener than an actual solvent. Examples of suitable thickners are, petrolatum and animal fat such as lard.

The proportions in which the active compound is dissolved or admixed with the solvent medium will vary widely depending upon the intended use of the composition. In general the active compounds will be mixed with the solvents in the proportion of about 1 part of active compound to 1,000 parts of solvent. In the case of treating delicate tissues, however, the proportions may be changed to 1 part of the active compound to 1 to 10,000 parts, and in some cases as high as 1 to 500,000 parts of solvent.

For industrial purposes the strength of the composition may be increased substantially over the above. For example, in the manufacture of protective paints and penetrants, a proportion of 1 part of the active compound to about 500 parts of the solvent may be used.

The following illustrative but non-limiting examples are given to illustrate more specifically the compositions of my invention and their application.

Example I

A solution of 1 part iodoacetone, mutually dissolved in 500,000 parts of acetone kills staphylococcus aureous and the spores of penicillium suspended in the solution, in five minutes.

Example II

Iodoacetophenone dissolved in acetone and mixed with petrolatum provides a composition which has proved efficacious against fungus infections and staphylococcus infections of the skin and scalp.

Example III

The dry rot of wood and also the attack of termites on wood is inhibited by the treatment of the wood with a composition made up of about 1 part of bromacetone with 500 parts of a penetrative solvent such as acetone, benzene or cresylic acid neutralized with lime. The same compositions may be used effectively on the coverings of electric cables and the like and cause them to resist the attacks of fungi or other microorganisms when buried in the earth. Paints employing such mixtures as the above and applied to metal or wood, resist staining and fouling.

When any of the above described types of compositions characteristic of my invention are applied to tissues or surfaces containing moisture or other media having an active hydrogen, the composition although theretofore stable, becomes very unstable and decomposes with liberation of the active halogen. As explained above, this decomposition is believed to be effected by, or at least accelerated by, the auxodyne group in the active compound. When the compositions of my invention are applied for example, to animal or vegetable living tissue, the moisture in the tissue will be sufficient to cause quick decomposition of the active material so that the effective halogen will be released promptly and attack the micro-organism or fungi. From this explanation it will be understood that if the compositions are applied to some surface not containing moisture or media not containing active hydrogen, decomposition may be effected by the addition of water or such media. Examples of active media other than water are alcohols, ammonia, acids, alkalis, primary and secondary amines, acetylene.

The inert and stabilizing solvents which are used in the composition to prevent decomposition of the active compound before it is ready for use, are preferably water-miscible so that when the composition is brought into contact with water the water will most easily reach and decompose the active compound. This rate of decomposition may be adjusted as desired by the selection of solvents which vary in their water miscibility. Where a slow acting composition is desired a solvent having low water miscibility is used. The action of water on the halogenated compounds is apparently one of evolution of nascent or free halogen which attack the bacteria, fungi, protozoa or other micro-organisms.

The halogens which are to be included as useful in the compositions of my invention are bromine, chlorine, fluorine, iodine and substances which are not truly halogens, but which may be considered pseudo halogens, such as represented by the groups SCN, OCN and CN.

This application is a continuation-in-part of my application Serial No. 49,025, filed November 9, 1935.

I claim:

1. A germicidal composition which is stable in air and liberates an active halogen ingredient when contacted with water, the composition comprising a potentially active lachrymatory halogen substitution product of acetophenone and a stabilizing thin organic water-miscible liquid serving as a solvent for the halogen substitution product, the said solvent being selected from the group consisting of acetone, methyl ethyl ketone, ethyl ketone, methyl acetate, ethyl acetate, acetaldehyde, furfural, methyl furfurate, diethyl ether, and diphenyl ether.

2. A germicidal composition which is stable in air and liberates the active ingredient when contacted with water, the composition comprising a potentially active lachrymatory halogen substitution product of a ketone and a stabilizing thin organic water-miscible liquid serving as a solvent for the halogen substitution product, the said solvent being selected from the group consisting of acetone, methyl ethyl ketone, ethyl ketone, methyl acetate, ethyl acetate, acetaldehyde, furfural, methyl furfurate, diethyl ether, and diphenyl ether.

3. A germicidal composition which is stable in air and liberates the active ingredient when contacted with water, the composition comprising a potentially active lachrymatory halogen substitution product of acetone and a stabilizing thin organic water-miscible liquid serving as a solvent for the halogen substitution product, the said solvent being selected from the group consisting of acetone, methyl ethyl ketone, ethyl ketone, methyl acetate, ethyl acetate, acetaldehyde, furfural, methyl furfurate, diethyl ether, and diphenyl ether.

FREDERICK R. WEEDON.